United States Patent [19]
Reneau

[11] Patent Number: 5,549,432
[45] Date of Patent: Aug. 27, 1996

[54] COMPOSITE COUPLING NUT AND METHOD OF MAKING SAME

[75] Inventor: Phillip G. Reneau, Hamilton, Ind.

[73] Assignee: Winzeler Stamping Company, Montpelier, Ohio

[21] Appl. No.: 385,054

[22] Filed: Feb. 7, 1995

[51] Int. Cl.⁶ .............................. F16B 37/08; F16L 35/00
[52] U.S. Cl. .................. 411/432; 411/431; 411/902; 411/408; 285/38
[58] Field of Search ..................... 411/408, 901, 411/902, 903, 908, 427, 429, 430, 431, 432; 285/38

[56] References Cited

U.S. PATENT DOCUMENTS

| | | | |
|---|---|---|---|
| 2,832,616 | 4/1958 | Morse | 411/902 |
| 3,121,355 | 2/1964 | Morel | 285/38 |
| 3,168,333 | 2/1965 | Duziura | 411/432 |
| 4,058,031 | 11/1977 | Magarian . | |
| 4,121,963 | 10/1978 | Yardley et al. . | |
| 4,537,825 | 8/1985 | Yardley . | |
| 4,803,031 | 2/1989 | Ochs et al. . | |
| 4,805,933 | 2/1989 | Swisher | 285/38 |
| 4,807,772 | 2/1989 | Schloss . | |
| 4,846,362 | 7/1989 | Schloss . | |

FOREIGN PATENT DOCUMENTS

| | | | |
|---|---|---|---|
| 29564 | 3/1977 | Japan | 411/908 |
| 2233724 | 1/1991 | United Kingdom | 285/38 |

*Primary Examiner*—Flemming Saether
*Attorney, Agent, or Firm*—Donald R. Fraser

[57] ABSTRACT

A composite coupling nut and method of making the same wherein a substantially rigid annular body portion with an internal threaded portion is provided with an outer annular layer of an elastomeric material formed thereon in intimate juxtaposed relation to increase the grasping coefficient.

7 Claims, 1 Drawing Sheet

COMPOSITE COUPLING NUT AND METHOD OF MAKING SAME

BACKGROUND OF THE INVENTION

The present invention relates to a composite coupling nut and method of making the same, and more particularly to a composite soft grip coupling nut and the method of fabricating the nut from a composite wherein the outermost peripheral surface is soft to the touch of an operator.

Homeowners and gardeners are often confronted with the placement and replacement of garden hoses used to supply water to nozzles, sprinklers, bubblers and the like equipment in the watering of plants, vegetables, trees, and other vegetation. In many instances, the coupling is used to couple lengths of garden hoses together and to connect one of the ends to a faucet and the opposite end to a water distribution device when they are not completely tightened. Thus, leakage of the coupling occurs resulting in wasting of water, allowing water to flow to unwanted areas and other unwanted consequences.

As a general rule, the problem of coupling leakage results from inadequate tightening of the hose couplings. These couplings typically include cooperating male and female threaded coupling elements which are manually grasped and tightened. Since the fittings are typically of a rather small diameter, there is a small amount of mechanical advantage available for the turning moments of the fitting elements of the threaded connection. Also, the threaded elements are exposed to soil and are subjected to mechanical abuse resulting in obstruction to the threading engagement of the elements and misalignment. the binding of the threads which results typically militates against the proper compression of the associated gaskets and leakage thereby occurs.

Amongst other problems in obtaining a good, fluid-tight seal between the threaded components of the typical hose coupling is the lack of strength of the person operating the hoses to effect the desired leak-proof connection.

DESCRIPTION OF THE PRIOR ART

Attempts have been made to overcome certain of the problems set forth above.

In U.S. Pat. No. 4,058,031 "Wrench for a Substantially Circular Workpiece" issued Nov. 15, 1977 in the name of Masick C. Magarian is exemplary of the development of a device to facilitate the connection and disconnection of garden hoses and the like. The device illustrated and described therein comprises an annular elastic body of rubber, plastic or the like adapted to be tensioned about the workpiece and has a resiliently compressible inner surface adapted to conform to the workpiece when the annular body is tensioned thereabout and includes an outer surface having outwardly extending grasping protuberances.

SUMMARY OF THE INVENTION

It is an object of the present invention to produce a composite coupling nut for use in garden hose connections which can facilitate the tightening thereof.

It is another object of the invention to produce a composite coupling nut for use in garden hose couplings which is soft to the touch and provides an improved coefficient of friction for the user.

Still another object of the invention is to produce a composite coupling nut for use in garden hose couplings whereas the outermost peripheral surface is formed of an elastomeric material.

Another object of the invention is to produce a composite coupling nut for use in garden hose couplings which will facilitate the tightening thereof.

Another object of the invention is to produce a composite coupling nut for use in garden base couplings which is easily manufactured, durable and can be fabricated economically.

Another object of the invention is to produce a method for making a composite coupling nut which utilizes available molding equipment and known chemical substituents.

Further objects and advantages of this invention will be apparent from the following description and appended claims, reference being made to the accompanying drawings forming a part of the specification, wherein like reference characters designate corresponding parts in the several views.

BRIEF DESCRIPTION OF THE DRAWINGS

The above, as well as others, objectives and advantages of the invention will become readily apparent to those skilled in the art from reading the following detailed description of the preferred embodiments of the invention when considered in the light of the accompanying drawings, in which.

DETAILED DESCRIPTION OF THE PREFERRED EMBODIMENTS

Figure 1:
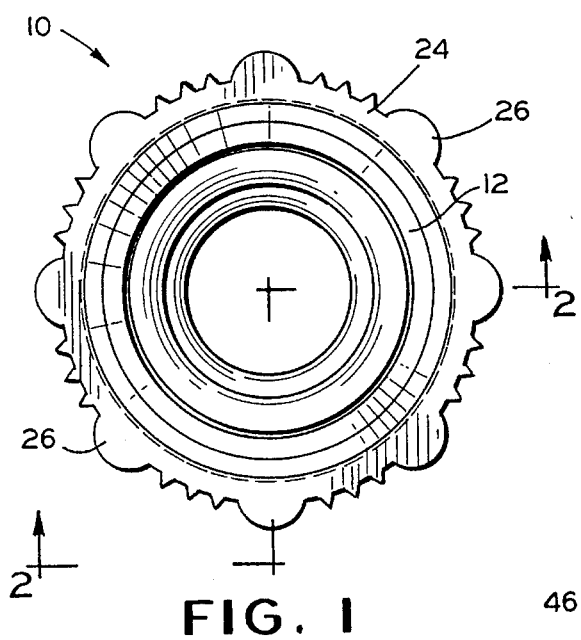
FIG. 1 is a top plan view of a composite coupling nut embodying the features of the invention.
Figure 2:
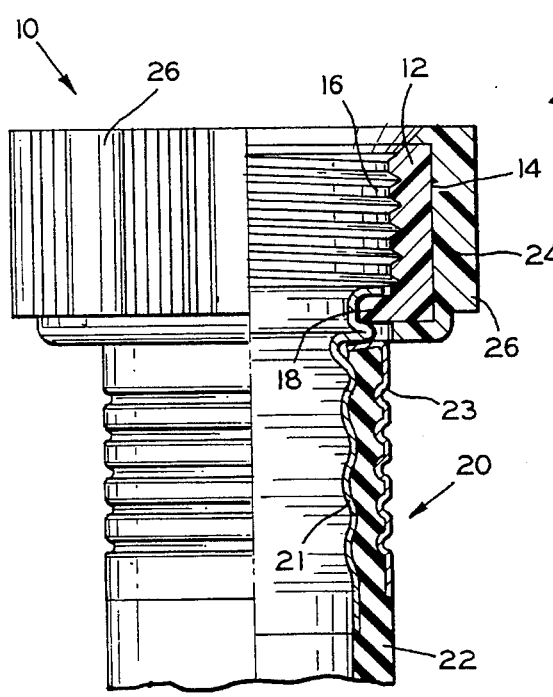
FIG. 2 is a sectional view of the composite coupling nut illustrated in FIG. 1 taken along line 2—2 thereof.

Referring to the drawings, and more particularly to FIGS. 1 and 2, there is illustrated a composite coupling nut embodying the features of the invention and generally designated by reference numeral 10.

The composite coupling nut 10 includes an annular body portion 12 having an uninterrupted annular outer peripheral surface 14. The annular body portion 12 is formed of a substantially rigid material such as nylon, brass, polypropylene, Valox, or Delrin, for example.

The annular inner surface of the body portion 12 is formed with threads 16. The threads 16 are compatible with the male threaded portion of a hose terminal, faucet, water distribution system, or the like.

One end of the body portion 12 of the nut 10 terminates in an inwardly extending flange 18. The flange 18 is designed to cooperate with a fitting 20 carried by a garden hose 22, for example. The body portion 12 of the nut is coupled to the fitting 20 to permit relative rotation between the nut 10 and the fitting 20 at hose 22.

The exterior surface 14 of the nut 10 is provided with an outer annular layer 24 formed of an elastomer material such as a thermoplastic rubber material which is commercially available under the trademark SANTOPRENE manufactured and/or sold by Advanced Elastomer Systems L.P., St. Louis, Mo. The SANTOPRENE thermoplastic material is a family of advanced elastomers which successfully combine the performance characteristics of vulcanized rubber, such as heat resistance and low compression set, with the processing ease of thermoplastics. The material consists of crosslinked rubber particles dispersed throughout a continuous matrix of thermoplastic material. Due to the thermoplasticity and the melt flow characteristics, the material may be processed on standard thermoplastic equipment, such as injection molding equipment, for example, with the efficiency and economy associated with thermoplastic materials. While it has been found that the above mentioned elastomeric material is satisfactory for obtaining the desired objectives of the invention, it will be understood that the physical properties of the elastomeric material include a material which at room temperature is capable of recovering substantially in shape and size after removal of a deforming force and is capable of being repeatedly softened by increase of temperature and allowed to harden by decrease of temperature.

In order to produce the composite coupling nut 10, the preformed annular body portion 12 is placed with the mold cavity of an injection molding machine. It has been found that satisfactory results can be obtained by forming the annular body portion 12 from an acetal resin such as manufactured and sold by DuPont under the trademark DELRIN. This resin will melt within a temperature range of from 380°–440° F.

Next, a sufficient quantity of the aforementioned SANTOPRENE elastomeric resin is injected into the mold cavity to cover the outermost peripheral surface 14 and form the inwardly extending flange 18. The temperature of the resin as it is introduced into the mold cavities is within a range of from approximately 380°–430° F. It is a desideratum of the invention to maintain the temperature of the elastomeric resin at a level sufficient to just melt the skin portion of the resin of the contacted portion in the annular body 12 to effect a melt bond between the body 12 and the injected layer 24 of elastomeric resin.

The molded composite is then permitted to cool sufficiently and is then removed from the cavity.

The composite coupling nut 10 is then affixed to a hose 22 by the fitting 20 which is comprised of a centrally disposed tail piece 21 and a cooperating outer coaxial ferrule 23. It will be noted that the tail piece 21 is formed to include an outwardly opening groove adapted to receive the inwardly extending flanged 18 which provides for the relative rotational movement between the nut 10 and the associated hose 22.

The outermost surface of the annular layer 24 of elastomeric material is formed to have a plurality of radially outwardly extending serrations or ribs 26 which provided to enhance and improve the gripping action with an operator's hand.

Figure 3:
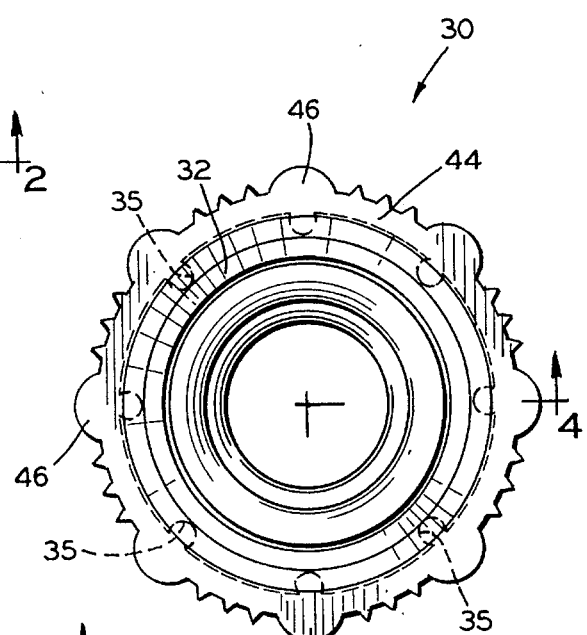
FIG. 3 is a top plan review of another composite coupling nut embodying features of the invention.
Figure 4:
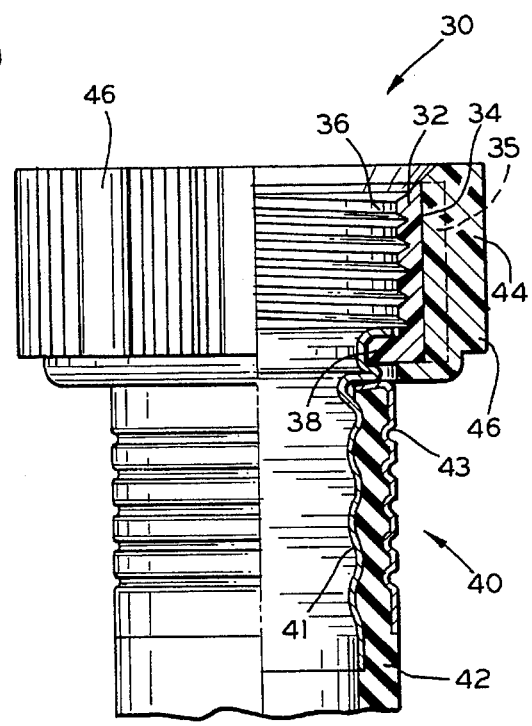
FIG. 4 is a sectional view of the composite coupling nut illustrated in FIG. 3 taken along line 4—4 thereof.

Another embodiment of the invention is illustrated in FIGS. 3 and 4 wherein there is illustrated a composite coupling nut embodying the features of the invention and is generally designated by reference numeral 30.

The composite coupling nut 30 includes an annular body portion 32 having an annular outer peripheral surface 34 provided with a plurality of axially extending generally parallel spaced apart grooves 35. The grooves 35 are accurate in cross-section with the centerline of the diameter of the arc of the grooves positioned inside the outer diameter of the annular outer surface 34.

The annular body portion 32 is formed of a substantially rigid material such as, for example, nylon, polypropylene, Valox, or Delrin.

The annular inner surface of the body portion 32 is formed with threads 36. The threads 36 are compatible with the male threaded portion of a hose terminal, faucet, water distribution system, or the like.

The exterior surface 34 of the nut 30 is formed with a plurality of spaced apart generally parallel axially extending grooves 35. It is deemed preferable to form the grooves 35 with an annular or circular cross-section wherein the opening of the grooves 35 is smaller than the diameter of the cross-section. [This will more firmly retain the elastomeric material of the outer annular layer 44.]

The surface 34 covered with an outer annular layer 44 in a manner similar to the described in connection with the layer 24 of the embodiment illustrated in FIGS. 1 and 2. An elastomeric material is employed in producing the annular layer 44. More specifically, the body portion 32 is placed within the mold cavity of an injection molding machine and the elastomeric material such as SANTOPRENE thermoplastic material is injected to produce the outer layer 44. The injected elastomeric material, while in its heated fluid condition, flows completely around the outer 34 surface of the annular body 32 and into the grooves 35. Upon cooling the elastomeric material within the grooves 35 will resist and militate against any relative movement, particularly rotation movement, between the body 32 and the outer layer 44.

One end of the body portion 32 of the nut 30 terminates in an inwardly extending flange 38. The flange 38 is designed to cooperate with a fitting 40 carried by a garden hose 42, for example. The fitting 40 is comprised of a centrally disposed tail piece 41 and a cooperating outer coaxial ferrule 43. The tail piece 41 has an outwardly opening annular groove adjusted to receive the inwardly extending flange 38 of the nut 30. The body portion 32 of the nut 30 is coupled to the fitting 40 to permit relative rotational movement between the nut 30 and the fitting 40 and the integral hose 42.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A composite coupling nut comprising:
    an annular body portion formed of a substantially rigid material having an outer peripheral surface provided with a series of spaced apart parallel grooves formed therein and an inner surface having threads formed therein, said grooves having an annular cross-section and an opening wherein the opening is smaller than a diameter of the cross-section; and
    an outer annular layer of an elastomeric material formed in intimate juxtaposed relation on the outer peripheral surface of said body portion and adapted to be disposed within the grooved formed in the outer peripheral surface of said body portion to increase the grasping coefficient.

2. A composite coupling nut as claimed in claim 1 wherein said substantially rigid material is nylon.

3. A composite coupling nut as claimed in claim 1 wherein said substantially rigid material is brass.

4. A composite coupling nut as claimed in claim 1 wherein said outer annular layer is formed of thermoplastic elastomeric material.

5. A composite coupling nut as claimed in claim 4 wherein said thermoplastic material is a rubber compound.

6. A composite coupling nut as claimed in claim 4 wherein the melting temperature of said thermoplastic material is lower than the melting temperature of said body portion.

7. A composite coupling nut as claimed in claim 1 wherein the grooves formed in said body portion extend axially thereof.

* * * * *